E. B. HESS.

WIND SHIELD FOR AUTOMOBILES.

APPLICATION FILED OCT. 4, 1917.

Reissued Dec. 18, 1917.

14,413.

2 SHEETS—SHEET 1.

Inventor

Edward B. Hess

By his Attorney

A. W. Beeken

ROBERS PETERS, INC., LITHO., WASHINGTON, D. C.

E. B. HESS.
WIND SHIELD FOR AUTOMOBILES.
APPLICATION FILED OCT. 4, 1917.
Reissued Dec. 18, 1917.
14,413.
2 SHEETS—SHEET 2.
Fig. 3
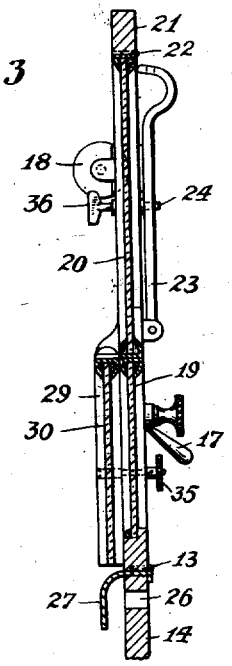
Fig. 4.
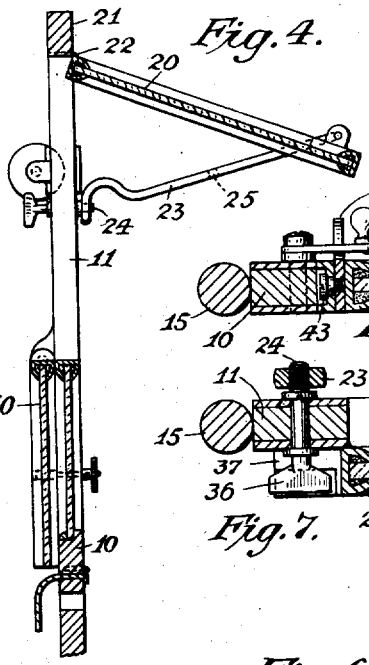
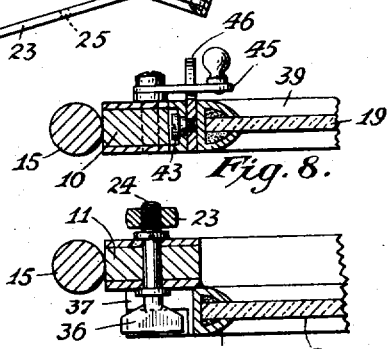
Fig. 8.
Fig. 7.
Fig. 6.
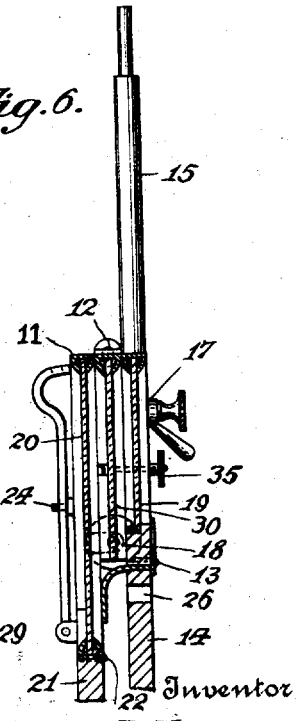
Fig. 5.
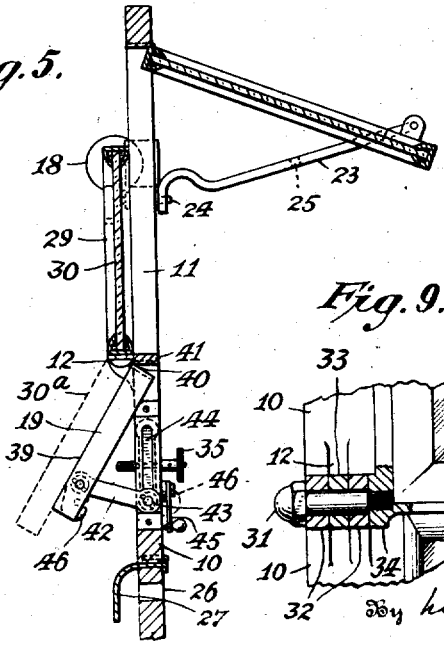
Fig. 9.
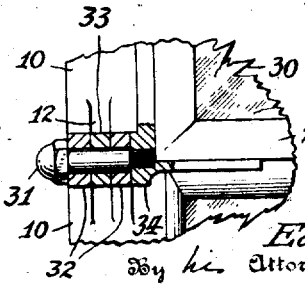
Inventor
Edward B. Hess
By his Attorney
A. W. Beeken
JOHNS PETERS, INC., LITHO., WASHINGTON D. C.

UNITED STATES PATENT OFFICE.

EDWARD B. HESS, OF BROOKLYN, NEW YORK.

WIND-SHIELD FOR AUTOMOBILES.

14,413. Specification of Reissued Letters Patent. Reissued Dec. 18, 1917.

Original No. 1,178,319, dated April 4, 1916, Serial No. 875,584, filed December 5, 1914. Application for reissue filed October 4, 1917. Serial No. 194,816.

*To all whom it may concern:*

Be it known that I, EDWARD B. HESS, a citizen of the United States, residing in the borough of Brooklyn, in the city and State of New York, county of Kings, have invented new and useful Improvements in Wind-Shields for Automobiles, of which the following is a specification.

This invention relates to improvements in that class of automobile wind shields which comprises two sections or sashes, the upper one of which is hinged, whereby it may be set to afford ventilation and act as a storm guard and adapted to be moved down alongside the lower section or sash.

The object of this invention is to provide an auxiliary sash so connected to the main frame of the shield that normally it may be set down against the lower section and be out of the line of vision, or moved up to act as a shield in the line of vision when the upper section or sash is set to act as a storm guard.

The invention also contemplates so connecting the lower sash to the main frame that it may be opened inwardly, swinging at its upper edge, to direct a current of air down toward the legs of the occupants of the front seat of the machine.

The details of construction, whereby these desirable ends are practically attained, will now be fully described by reference had to the accompanying drawings, in which—

Figure 1 is a front perspective view of the wind shield complete, partly in section, with one side of the main frame removed:

Fig. 2, an inside elevation of the same:

Fig. 3, a vertical sectional view showing the upper sash closed to act as a wind shield in the ordinary way, and the auxiliary sash set in downward position:

Fig. 4, a similar view with the upper sash set to act as a storm guard, leaving the line of vision clear:

Fig. 5 shows the upper sash set as a storm guard, the auxiliary sash being set to act as a wind shield in the line of vision and the lower sash opened inwardly for ventilating purposes:

Fig. 6 shows both the upper sash and auxiliary sash set down out of the line of vision:

Figure 2:
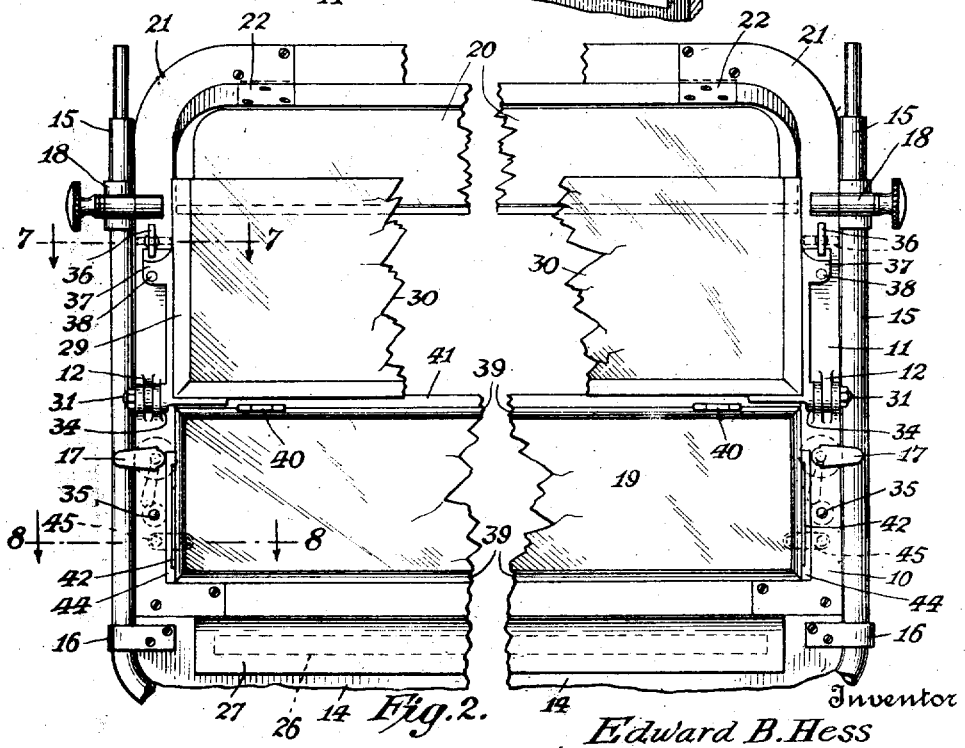

Fig. 7, a fragmentary sectional view on the line 7, 7, Fig. 2:

Fig. 8, a similar view on line 8, 8, Fig. 2, and

Fig. 9, a sectional view of one of the hinge connections of the upper and auxiliary sashes.

The main frame consists of two parts 10 and 11, hinged together by hinge connections 12; the lower part 10 is, by hinges 13, connected to the upper edge of a frame piece 14 to which the two side posts 15 are secured by braces 16. The lower part 10 is also detachably connected to the side posts 15 by clamps 17, and the upper part 11 of the main frame is by clamps 18 attached to the posts 15, said clamps being constructed to slide on the posts. This arrangement of hinges and clamps provides for setting the upper part 11 of the frame and upper sash down out of the field of vision, as shown at Fig. 6, and this is accomplished by loosening the clamps 17 and setting them away from the posts, loosening the clamps 18, pressing the hinged connected edges of parts 10 and 11 forwardly and then folding the upper part 11 of the frame inwardly to hang down as shown. The clamps 18 during such movement of this part 11 of the frame slide down the posts 15. The lower sash 19 is carried by the lower part 10 of the frame and the upper sash 20 is, by its upper edge, secured to the top bar 21 of the frame by hinges 22. The upper sash is held in open position, as shown in the main views and Figs. 4 and 5 of the drawings, by means of a strut or supporting bar 23 at each side of the sash, pivoted at one of their ends thereto and adapted by their other ends to be secured to the main frame by thumb screws 24, which are arranged to turn in the frame and be screwed into holes formed in the ends of the bars 23, see Figs. 4 and 5. These thumb screws 24 also hold the upper sash 20 in closed shielding position by being screwed into holes 25 mediate the ends of the bars 23, as shown at Fig. 3.

26 designates a slot in the frame piece 14 and 27 a guide plate for directing air currents, passing through the slot, in a downward direction.

The auxiliary wind shield of this invention consists of a frame 29, holding a plate of glass or other transparent material and constituting a sash 30, similar to the other sashes of the wind shield. This frame 29 has, at its upper edge, a swinging axis adjacent the central part of the main frame, said swinging axis being preferably in line with the hinge connections 12 of the two parts of the main frame. Fig. 9 illustrates a suitable manner of pivotally connecting the frames of the three sashes together, consisting of a screw stud 31 which passes through lugs 32 and 33 at each side of the two parts 10 and 11 of the main frame and seated in a lug 34 at each side of the end of one of the longitudinal edges of the frame of the auxiliary sash 30. The arrangement is such that when the auxiliary sash 30 is down in normal position, out of use, it lies in rear of the lower sash 19, as shown in Figs. 3 and 4, in which position it is held by a thumb screw 35 at each side of the frame, fitted to rotate freely therein without endwise movement and screwed into tapped apertures in the side bars of frame 29. When the upper sash 20 is folded down, as shown at Fig. 6, the auxiliary sash 30 is between sashes 19 and 20. The auxiliary sash 30 after being released by unscrewing the thumb screws 35 may be raised to act as a wind shield, in the field of vision, see Figs. 1, 2 and 5, and in this position it may be securely held by the flat heads 36 of the thumb screws 24, acting by their inner edges on inclined edges of lugs 37, projecting from the sides of the frame of sash 30, see Figs. 1, 2, and 7. The flat heads 36 of screws 24 move off lugs 37 when turned in horizontal position, see Fig. 7 and dotted lines Figs. 1 and 2, and so release the sash 30, leaving it free to be set down in normal inactive position; in which position it is firmly held by the screws 35 manipulated to enter the tapped holes 38 in the lugs 37.

The other feature of the invention, viz. provision for affording ventilation of the part of the machine behind and below the wind shield, for cooling effects on the legs and lower parts of the bodies of occupants, comprises means for setting and holding the lower edge of the sash 19 inwardly. The glass or other material forming the body of this sash is carried in a frame 39 fitted in the lower part 10 of the main frame and attached, by means of hinges 40 at its upper edge, to a bar 41 extending across the top of frame 10, see Figs. 2 and 5. The means for holding the lower part of sash 19, both in open and closed positions, consists of bars 42 pivoted at one of their ends to the sides of the sash and having at their other ends headed studs 43 held in slotted plates 44 in recesses formed in the frame 10. These studs slide down to the lower end of the slotted plates 44 when the sash is opened, and so cause the bars 42 to securely hold the sash in open position, as shown in Fig. 5. To close the sash, the stud ends of the bars are raised and occupy the position shown by dotted lines when the sash is fully closed. The sash is held closed by short lever arms 45, pivotally connected to the part 10 of the main frame and adapted to be set in latch slots formed in the edge of side extensions 46 at the pivoted ends of the bars 42.

Figure 1:
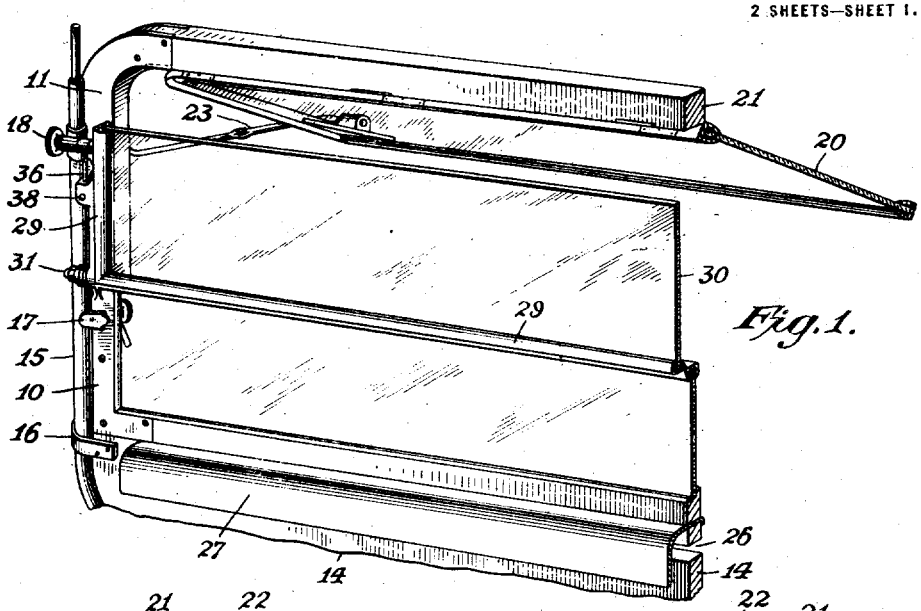

From the foregoing it will be seen that this invention provides a wind shield of universal adaptability. As an ordinary complete wind shield the parts may be set as shown in Fig. 3; or to provide an open free field of vision the upper sash 20 may be set as shown in Fig. 4; the sash 20 will in this position act as a rain shed or guard. In both of these conditions the auxiliary sash 30 is set and held down in normal inoperative position. It might here be stated that what is meant by "field of vision" is the space above the lower section or sash 19, it being the general direction of observation ahead by the driver and occupants of the automobile. Of course observations may be had through the lower sash, but, for purposes of definition of field of vision the lower sash may be translucent or opaque. Now with the auxiliary sash set as shown in Figs. 1, 2 and 5 the field of vision will be protected from winds, etc., and with the upper sash 20 raised, as shown, there will be only one sheet of transparent material interposed in the field of vision, and that will be fully protected from rain or inclement weather by the outwardly extending upper sash 20. This is an important feature for, as is well known, rain, sleet or other deposits on a wind shield is a source of inconvenience and often troublesome to the machine driver. With the auxiliary sash up and with the lower sash open, as shown in Fig. 5, protection against the full force of the wind is had and sufficient ventilation and cooling effects provided. Furthermore complete ventilation or open air effects may be had with the upper and lower sashes 20 and 19 set as shown in Fig. 5 and the auxiliary sash 30 dropped down on to the lower sash, as shown by the dotted lines $30^a$.

I claim:

1. A wind shield comprising: supporting means, a lower shield section occupying an upright position below the line of vision, an upper shield section normally in an upright position in the line of vision above the lower section, an auxiliary shield section normally in an upright position below the upper section and alongside the lower section, means admitting the upper section to be moved into a sustained forwardly inclined position independently of the other sections, and means admitting the auxiliary section to be moved independently of the upper section into a sustained inverted upright position in the field of vision above the lower section when the upper section is in a forwardly inclined position.

2. A wind shield comprising: supporting means, a lower shield section occupying an upright position below the line of vision, an upper shield section normally in an upright position in the line of vision above the lower section, an auxiliary shield section normally in an upright position below the upper section and alongside the lower section, means admitting the upper section to be moved into a sustained forwardly inclined position independently of the other sections, means admitting the auxiliary section to be moved independently of the upper section into a sustained inverted upright position in the field of vision above the lower section when the upper section is in a forwardly inclined position, and means admitting the lower section to be moved into a rearwardly inclined ventilating position when the auxiliary section is in its inverted upright position.

3. A wind shield comprising: supporting means, a lower shield section occupying an upright position below the line of vision, an upper shield section normally in an upright position in the line of vision above the lower section, an auxiliary shield section normally in an upright position below the upper section and alongside the lower section, means admitting the upper section to be moved into a sustained forwardly inclined position independently of the other sections, means admitting the auxiliary section to be moved independently of the upper section into a sustained inverted upright position in the field of vision above the lower section when the upper section is in a forwardly inclined position, and means admitting the lower and auxiliary sections to be moved into a rearwardly inclined ventilating position when the auxiliary section is in its normal position alongside the lower section.

4. An automobile wind shield, comprising a supporting frame, a main lower shield section mounted therein below the direct field of vision, an auxiliary lower shield section mounted on said frame and pivotally connected at its upper edge therewith adjacent the upper edge of said main lower section and adapted to hang by the side thereof or to be raised to a position in the direct field of vision, means for fastening said auxiliary section in either its raised or lowered position, an upper shield section movable independently of said auxiliary section, pivotally connected at its upper edge to the supporting frame, which when lowered forms a closed continuation of said lower section and which when swung outward serves as a rain guard, and means for fastening said auxiliary section in either its raised or lowered position.

5. An automobile wind shield, comprising vertical side posts, a supporting frame connected therewith, a main lower shield section pivotally mounted in the frame below the direct field of vision, an auxiliary section mounted on said supporting frame pivotally connected at its upper edge therewith adjacent the upper edge of said main lower section and adapted to hang by the side of said main lower section or to be raised to a position in the direct line of vision, means for fastening said auxiliary section in either its raised or lowered position, an upper shield section, movable independently of said lower and auxiliary sections and pivotally connected at its upper edge to the supporting frame, which when lowered forms a closed continuation of said lower section and which when swung outward serves as a rain guard, and means for fastening said upper section in either its upper or lower position.

6. An automobile wind shield comprising a two part main frame pivotally connected, an upper section or sash hinged to the upper part of the main frame, a lower section or sash carried by the lower part of the main frame, an auxiliary sash so connected to the pivotal connection of the frame as to lie normally alongside of the lower sash and adapted to be set up in the field of vision when the upper part of the main frame and the upper sash are elevated, and means for holding the two-part frame in its upright or extended position.

7. An automobile wind shield comprising a two part main frame pivotally connected, an upper section or sash hinged to the upper part of the main frame, a lower section or sash carried by the lower part of the main frame, an auxiliary sash so connected to the pivotal connection of the frame as to lie normally alongside of the lower sash with the upper part of the main frame and upper sash in operative positions and adapted to be set up in the field of vision, said upper sash being adapted to be moved down below the field of vision alongside of the lower sash, and means for holding the two-part frame in its upright or extended position.

8. An automobile wind shield comprising a main frame, an upper sash hinged by its top edge to the upper part of the frame, a lower sash hinged by its top edge to the central part of the frame, an auxiliary sash carried by the lower part of the main frame and pivotally connected by its upper edge to the frame adjacent the juncture of the upper and lower sashes and below the field of vision, normally held against the lower sash with the upper sash in operative position and adapted to be raised as a wind shield in the field of vision, and means for holding the main frame in position.

9. An automobile wind shield, comprising a two part main frame pivotally connected, three sashes, an upper sash hinged to the upper part of the main frame, a lower sash hinged at its upper edge to the lower stationary part of the main frame, an auxiliary sash hinged at one of its edges to the main frame adjacent the junctures of the two parts thereof, whereby the upper sash and auxiliary sash may be set below the field of vision adjacent the lower sash, and means for holding the two-part frame in its upright or extended position.

Signed at New York, in the county of New York and State of New York, this 3rd day of October, 1917.

EDWARD B. HESS.